April 27, 1948.  F. W. FRINK  2,440,438
CALCULATING DEVICE
Filed Feb. 5, 1947  3 Sheets-Sheet 1
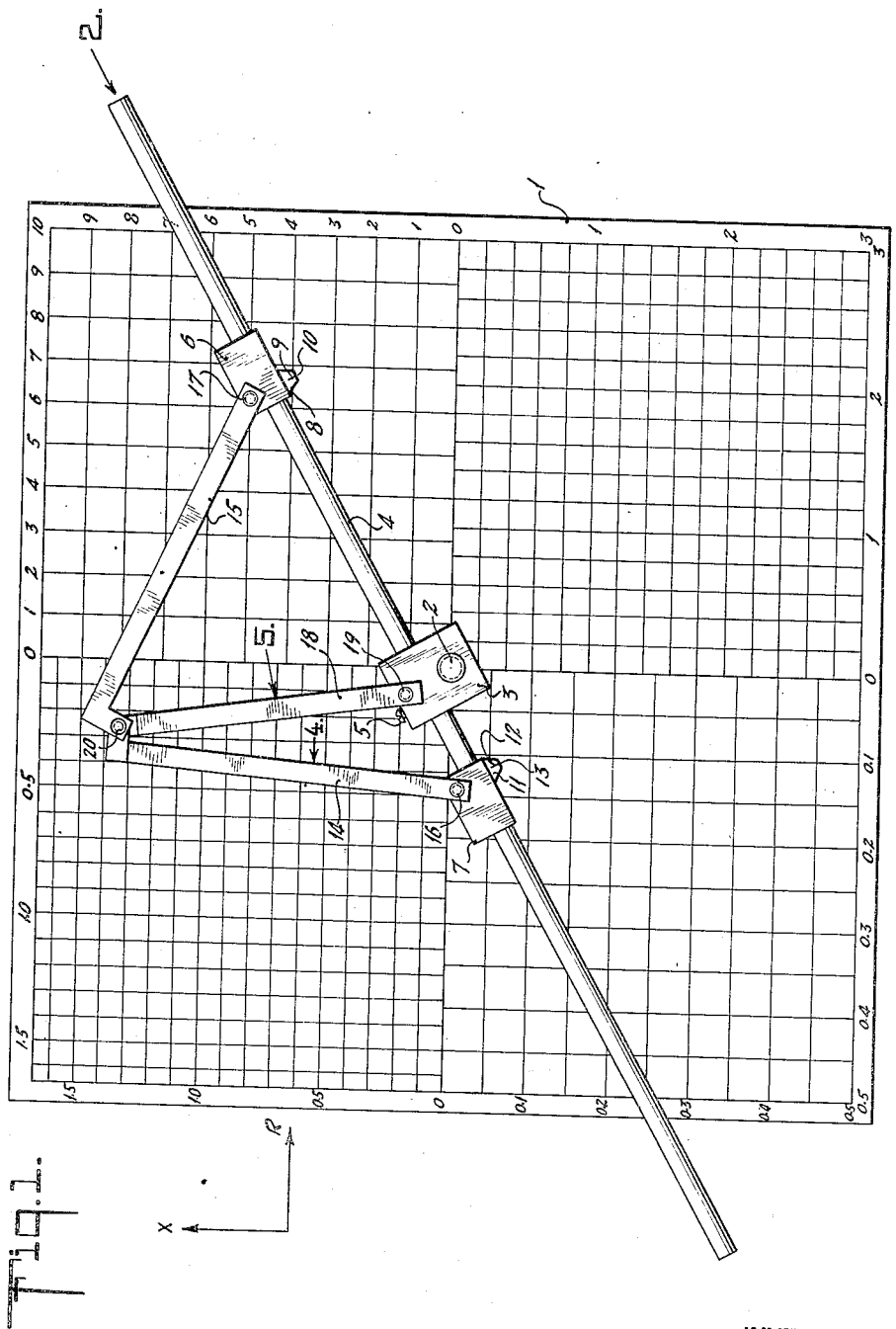
INVENTOR
BY *Frederick W. Frink*

April 27, 1948. F. W. FRINK 2,440,438
CALCULATING DEVICE
Filed Feb. 5, 1947  3 Sheets-Sheet 2
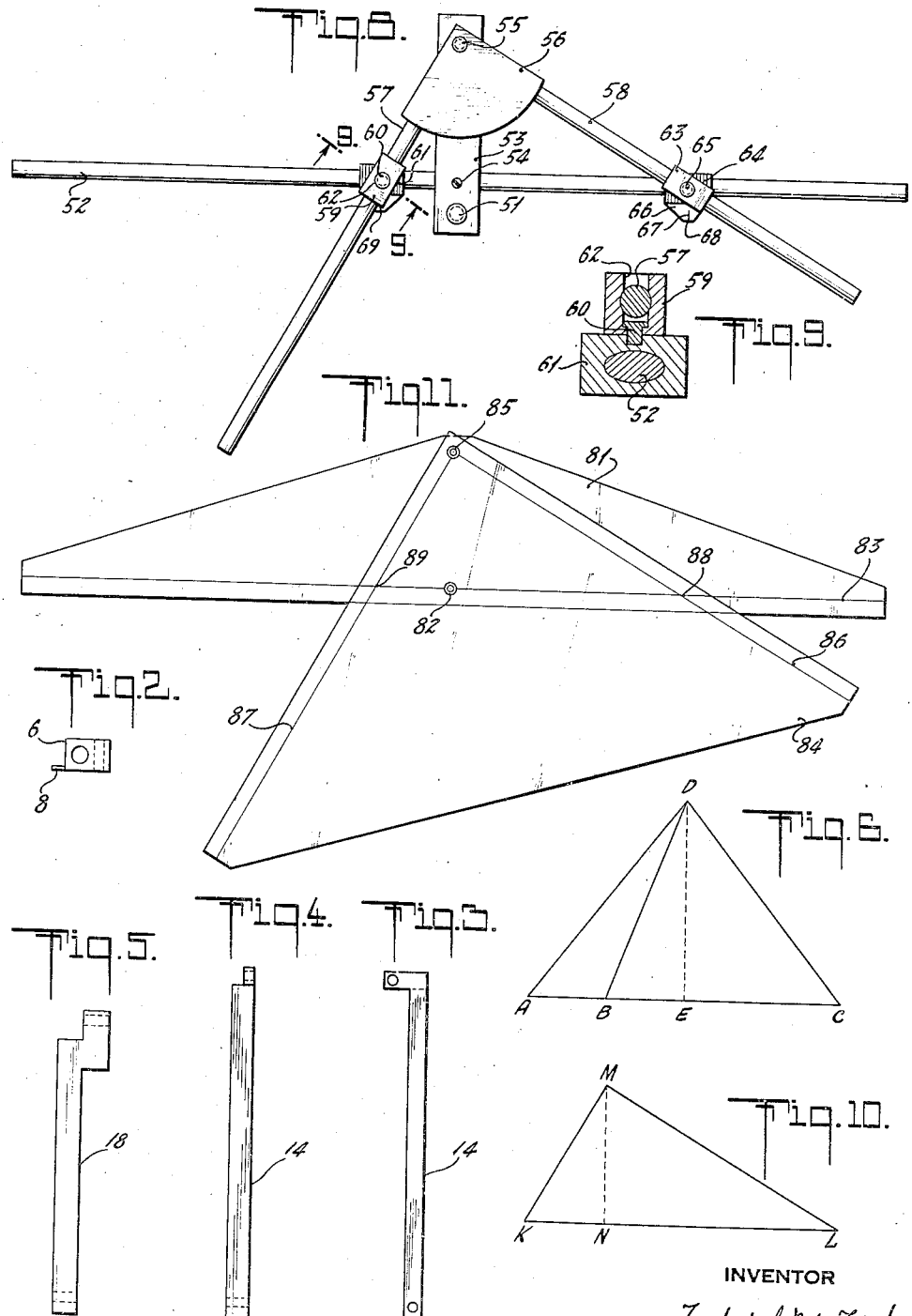
INVENTOR
BY Frederick W. Frink April 27, 1948.  F. W. FRINK  2,440,438
CALCULATING DEVICE
Filed Feb. 5, 1947  3 Sheets-Sheet 3

INVENTOR
BY Frederick W. Frink

Patented Apr. 27, 1948

2,440,438

UNITED STATES PATENT OFFICE 2,440,438

CALCULATING DEVICE

Frederick W. Frink, East Orange, N. J.

Application February 5, 1947, Serial No. 726,526

19 Claims. (Cl. 235—61)

1

This invention pertains to calculating devices generally, and more particularly it pertains to devices for finding the reciprocals of numbers, including complex numbers.

It is well known that in calculations pertaining to alternating-current electric circuits it is frequently necessary to find the resultant impedance of two impedances in parallel. If the circuit constants are lumped, each of the two impedances is usually expressed in complex form; that is, in terms of a complex number whose real component represents the resistance component of the impedance and whose imaginary component represents the reactance component of the impedance. Furthermore, it is usually desired that the resultant impedance be expressed in complex form, because it is usually necessary to add this resultant impedance to some other impedance that is connected in series with it, and such addition can be performed most easily when the impedances are in complex form.

In finding the resultant of two impedances in parallel, the following procedure is usually employed: First, each impedance is converted from the complex form to the polar form, in which the impedance is represented by a vector whose length is sometimes called the "absolute value," and whose direction is expressed in terms of an angle sometimes called the "phase angle" of the impedance. The reciprocal of each impedance is then calculated, by taking the reciprocal of the absolute value and reversing the direction of the phase angle, and this calculated reciprocal is equal to the admittance, expressed in polar form, corresponding to the given impedance. Each of the two admittances is then changed from polar to complex form, and the two admittances are added together, to obtain the resultant admittance in complex form. Next, the resultant admittance is converted from complex to polar form and the reciprocal is taken, to obtain the resultant impedance in polar form. Finally, the resultant impedance is converted from polar to complex form, to obtain the solution of the problem in the desired form.

The above procedure, though based on simple principles, is very fatiguing and time-consuming and it can be greatly simplified by the use of my invention, which is a mechanism that calculates the reciprocal of any complex number and indicates this reciprocal in complex form.

One object of my invention is to provide a mechanism which calculates the reciprocal of any number, whether natural, imaginary, or complex. Another object is to increase the speed

2 and ease with which such calculations can be made. Still another object is to facilitate and expedite the calculation of the resultant impedance of two electrical impedances in parallel. Other and ancillary objects will appear hereinafter.

Figure 1 is a top view of one embodiment of my invention.

Figures 2, 3, 4, and 5, are views of certain parts of the embodiment shown in Figure 1, shown for the purpose of clarifying their construction.

Figure 6 is a geometrical figure used in explaining the mathematical principles on which the device of Figure 1 is based.

Figure 8 is a top view of still another embodiment of my invention.

Figure 9 is a sectional view of certain details of the embodiment shown in Figure 8.

Figure 10 is a geometrical figure used in explaining the mathematical principles on which the embodiment shown in Figure 8 is based.

Figure 11 is a top view of another embodiment of my invention.

Figure 7:
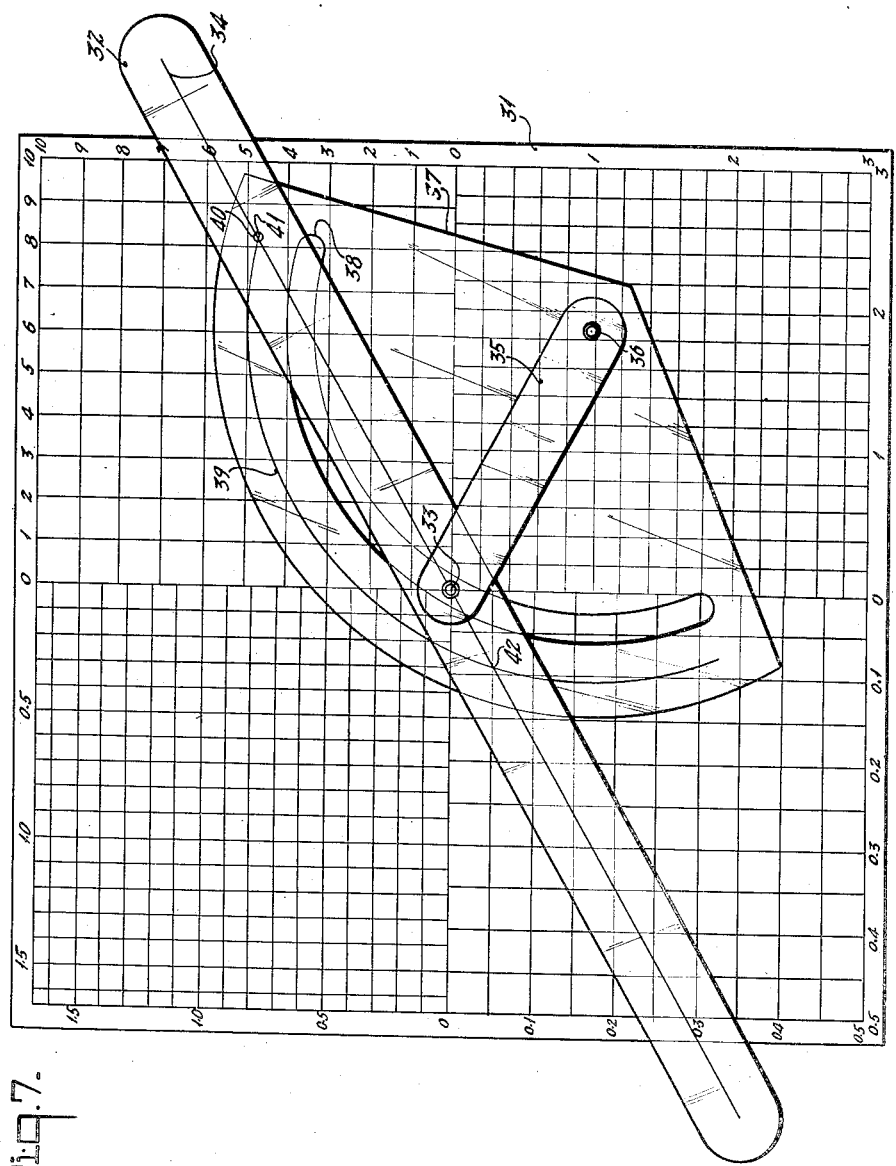
Figure 7 is a top view of another embodiment of my invention.

In Figure 1, which represents one embodiment of my invention, part 1 is a flat plate which serves as a base for the mechanism. Each of the four quarters of this base is engraved or printed with two sets of parallel lines representing a system of linear rectangular coordinates, in which abscissas are measured in the direction of arrow R and ordinates are measured in the direction of arrow X.

The spaces between the parallel lines on base 1 should be subdivided by means of additional parallel lines, so that the coordinate scales can be read more accurately; however, to simplify the drawing these additional lines have been omitted.

A pivot 2 is attached to base 1 at the intersection of the coordinate axes, by driving it into a tight-fitting hole in base 1. The head of pivot 2 is slightly larger than the shank, so that block 3 is able to rotate freely about this pivot, but can not readily be removed from the base 1. Part 4 is a straight rod of circular cross-section, which passes through a hole in block 3 and is held in place by a set screw 5.

Blocks or cursors 6 and 7 are free to slide along rod 4, which passes through holes in 6 and 7. Figure 2 shows how blocks 6 and 7 appear when viewed from the direction of arrow 2. Block 6 has a thin tab or boss 8 projecting from it, and on this tab is engraved a narrow line 9. The intersection of this line with the edge of tab 8 is used as an index, and is designated by the reference number 10. Similarly, block 7 has a tab 11 on which is engraved a line 12, and the intersection of this line with the edge of tab 11 serves as an index which is designated by the reference number 13. Indexes 13 and 10 lie on an imaginary straight line which passes through the center of pivot 2. These indexes are used as means for pointing out the location of certain points on base 1, as will be explained later.

Link 14 is attached to block 7 by a pivot 16, which has been driven into a tightly-fitting hole in 7, so that it is not easily removed. The head of pivot 16 is slightly larger than the shank, so that link 14 is not easily detached from block 7, although 14 can readily rotate about pivot 16. Link 15 is similarly attached to block 6 by pivot 17, and is free to rotate about pivot 17. In a similar way, link 18 is attached to block 3 by pivot 19, and is attached to links 14 and 15 by another pivot 20, which is driven into a tightly fitting hole in link 18.

Figure 5 shows a side view of link 18, viewed from the direction of arrow 5. This view shows how a step in link 18 makes it possible for links 14 and 15 to overlap link 18 at the point where they are attached to 18. Links 14 and 15 are identical to each other, and they have the form shown in Figures 3 and 4, which are top and side views, respectively, of link 14. Arrow 4 in Figure 1 shows the direction from which link 14 is viewed to obtain Figure 4. In Figure 1, links 14 and 15 are facing in opposite directions, and this makes it possible for 15 to overlap 14.

The reason for having right-angle bends in 14 and 15 is to prevent link 18 from interfering with the motion of links 14 and 15. The performance of the mechanism as a calculator depends on the straight-line distance between pivots 16 and 20, between pivots 17 and 20, and between pivots 19 and 20.

Pivot 16 should be located on block 7 in such a position that a line passing through the center of pivot 16 and index 13 will be at right angles to the center line of rod 4. A similar statement applies to pivot 17 and index 10. The centers of pivots 19 and 20 should lie on a straight line at right angles to the center line of rod 4. Pivots 16, 19, and 17, should all lie on a single straight line.

The mathematical principles involved in the mechanism of Figure 1 are best understood by first referring to Figure 6, in which distance $\overline{AD}$ represents the distance from pivot 16 to pivot 20, distance $\overline{CD}$ represents the distance from pivot 17 to pivot 20, and distance $\overline{BD}$ represents the distance from pivot 19 to pivot 20. Distance $\overline{AD}$ is equal to distance $\overline{CD}$ because links 14 and 15 are identical.

For purposes of mathematical analysis, assume that a perpendicular $\overline{DE}$ is dropped from point D to line $\overline{AC}$, intersecting it at point E. Distance $\overline{AE}$ is equal to distance $\overline{CE}$, because triangles AED and CED are both right triangles, their altitudes are equal, and their hypotenuses are equal. Since we are dealing with right triangles, we may write, $$\overline{BD}^2 = \overline{BE}^2 + \overline{DE}^2 \tag{1}$$

but $$\overline{BE} = \overline{AE} - \overline{AB}$$

Then, substituting this value of $\overline{BE}$ in Equation (1), we have, $$\overline{BD}^2 = (\overline{AE} - \overline{AB})^2 + \overline{DE}^2$$

or $$\overline{AE} - \overline{AB} = \sqrt{\overline{BD}^2 - \overline{DE}^2}$$

$$\overline{AB} = \overline{AE} - \sqrt{\overline{BD}^2 - \overline{DE}^2} \tag{2}$$

Now, leaving Equation 2 as it is, and returning to Equation 1 for a moment, we can see that since $\overline{BE} = \overline{BC} - \overline{EC}$, we may substitute this value of $\overline{BE}$ in Equation 1, thus obtaining, $$\overline{BD}^2 = (\overline{BC} - \overline{EC})^2 + \overline{DE}^2$$

or $$\overline{BC} - \overline{EC} = \sqrt{\overline{BD}^2 - \overline{DE}^2}$$

$$\overline{BC} = \overline{EC} + \sqrt{\overline{BD}^2 - \overline{DE}^2} \tag{3}$$

Multiplying Equation 2 by Equation 3, we obtain, $$\overline{AB} \times \overline{BC} = (\overline{AE} - \sqrt{\overline{BD}^2 - \overline{DE}^2})(\overline{EC} + \sqrt{\overline{BD}^2 - \overline{DE}^2}) \tag{4}$$

Since, as previously mentioned, $\overline{AE} = \overline{EC}$, we may change Equation 4 to read, $$\overline{AB} \times \overline{BC} = (\overline{AE} - \sqrt{\overline{BD}^2 - \overline{DE}^2})(\overline{AE} + \sqrt{\overline{BD}^2 - \overline{DE}^2})$$

or $$\overline{AB} \times \overline{BC} = \overline{AE}^2 - (\overline{BD}^2 - \overline{DE}^2)$$

$$= \overline{AE}^2 + \overline{DE}^2 - \overline{BD}^2 \tag{5}$$

But, as can be seen from an inspection of Figure 6, $$\overline{AE}^2 + \overline{DE}^2 = \overline{AD}^2$$

Then, substituting this in Equation 5, we have $$\overline{AB} \times \overline{BC} = \overline{AD}^2 - \overline{BD}^2 \tag{6}$$

Now, by referring to Figure 1 we can see that $\overline{AD}$ and $\overline{BD}$ are both constant, since they are based on the lengths of links 14 and 18. Equation 6 may therefore be written, $$\overline{AB} \times \overline{BC} = K$$

or $$\overline{AB} = K/\overline{BC} \tag{7}$$

where $$K = \overline{AD}^2 - \overline{BD}^2$$

In applying Equation 7 to the mechanism of Figure 1, we can see that $\overline{AB}$ is the distance from pivot 16 to pivot 19, or from index 13 to the center of pivot 2. Similarly, $\overline{BC}$ is the distance from pivot 17 to pivot 19, or from index 10 to the center of pivot 2. Equation 7 therefore indicates that the distance from index 13 to the center of pivot 2 is proportional to a constant multiplied by the reciprocal of the distance from index 10 to the center of pivot 2.

In finding the reciprocal of a complex number, the operator places index 10 at a point on base 1 whose abscissa corresponds to the real part of the complex number and whose ordinate corresponds to the imaginary part of the complex number. For example, in Figure 1 index 10 is shown in the position corresponding to the number $6.80 + j3.92$, where $j = \sqrt{-1}$.

The distance from index 10 to the center of pivot 2 corresponds to the absolute magnitude of the complex number in polar form, and the angle made by rod 4 with the axis of abscissas is equal to the angle of the polar form. The distance of index 13 from the center of pivot 2 corresponds to the absolute magnitude of the polar form of the reciprocal of the original complex number, and the operator can obtain the complex form of this reciprocal by merely reading the coordinates of index 13. In the case illustrated in Figure 1 the reciprocal is $0.1105-j0.0636$.

The mechanism does not indicate the algebraic sign which the imaginary component should have; however, the operator can easily determine the correct sign by remembering that the algebraic sign of the imaginary component of the reciprocal is always opposite to the algebraic sign of the imaginary component of the original complex number, because the operation of taking the reciprocal always reverses the angle, although this reversal of angle is not indicated by the mechanism.

In setting index 10 the operator should always measure off the imaginary component of the complex number in a positive direction, regardless of whether this component happens to have a positive sign or a negative sign. This does not cause any confusion, provided the operator follows the simple rule given above for finding the algebraic sign of the imaginary component of the reciprocal. In dealing with electrical impedances and admittances the operator will not ordinarily have to deal with complex numbers whose real components are negative; however, if the real component of the complex number was negative the real component of the reciprocal would also be negative.

In the lower right-hand portion of base 1 there is an alternative set of coordinate scales whose coordinates run from zero to 3 instead of zero to 10. This set of scales is intended to permit the operator to set index 10 more accurately for complex numbers that would fall too close to pivot 2 if the upper right-hand set of scales were used. When using the lower right-hand set of scales the operator has to measure imaginary components downward from the axis of abscissas instead of upward, but otherwise this set of scales is used in the same manner as the upper right-hand set of scales. When using the lower right-hand set of scales for setting index 10 the operator reads the reciprocal on the upper left-hand set of scales, each of which covers a range of numbers from zero to 1.666.

In setting index 10 for a complex number whose real and imaginary components do not come within a suitable range of values for using the coordinate scales, the operator can merely move the decimal points of both the real and the imaginary component the same number of decimal places, so that the two components come within a suitable range. For example, the setting of index 10 as shown in Figure 1 could be used to represent $680+j392$ or $0.680+j0.392$, instead of $6.80+j3.92$. In reading the reciprocal, the operator should move the decimal points the same number of places as in the original number, and in the same direction, in order to obtain the reciprocal of the original complex number. For example, the reciprocal of $6.80+j3.92$ is $0.1105-j0.0636$; but, in finding the reciprocal of $680+j392$ the operator would first move the decimal points two places to the left, thus obtaining $6.80+j3.92$, and would read the reciprocal as $0.1105-j0.0636$ and following this he would move the decimal points two places to the left, thus obtaining $0.001105-j0.000636$ as the reciprocal of the original complex number.

In calculating the resultant of two electrical impedances connected in parallel the operator first takes the reciprocal of each impedance by means of the mechanism of Figure 1, thus obtaining the corresponding admittances in complex form. These admittances are then added together, by adding the two real components together and also adding the two imaginary components together (algebraically), thus obtaining the resultant admittance in complex form. The reciprocal of this resultant admittance is then obtained, by means of the mechanism, and the resultant impedance is thus obtained in complex form. In using this method, which is relatively simple and rapid, the operator does not have to read, or deal with, the polar forms of the complex numbers, and does not have to use trigonometric functions or a slide rule.

To provide for any special cases in which the operator might happen to be interested in the polar forms of the impedances and admittances, it would be possible to provide graduations on rod 4 to allow the operator to read the magnitudes of the polar forms. The angles could be measured by means of a protractor scale placed opposite one end of rod 4.

The scales in the upper right-hand and lower right-hand quarters of base 1, which are used for setting index 10 in accordance with the complex number whose reciprocal is to be found, can be laid out arbitrarily to represent any ranges of numbers which start with zero. In Figure 1 there is a set of scales representing the range from zero to ten, and another set of scales representing the range from zero to three, but it would have been possible to select some other ranges, such as zero to five and zero to two, and then to lay out the scales accordingly.

After the ranges of numbers for these scales have been decided on, it necessary that the scales used for reading the reciprocals be laid out so that they are consistent with the scales used for setting index 10.

As an example of how to lay out these scales, suppose that in the upper right-hand set of scales shown in Figure 1 the distance along the axis of abscissas from 0 to 10 is ten inches. Let us assume, further, that the distance from pivot 16 to pivot 20 is 8.307 inches, and the distance from pivot 19 to pivot 20 is 7 inches. Substituting these values in Equation 6, we obtain, $$\overline{AB} \times \overline{BC} = (8.307^2 - 7^2) = 20 \qquad (9)$$

Suppose the operator sets index 10 at the position corresponding to the number $5+j0$, which position is five inches to the right of pivot 2. Then, the value of $\overline{BC}$ in Equation 9 is 5 inches, and the value of $\overline{AB}$ is found to be 4 inches. This means that in the lower left-hand set of scales on base 1 the vertical line labelled 0.2, which is the reciprocal of the number 5, should be located 4 inches to the left of pivot 2. The other lines used in the reciprocal-finding scales are located in a similar manner.

Figure 7 shows an alternative mechanism which is capable of performing the same function as the mechanism of Figure 1. Part 31 is a base similar to that shown in Figure 1, equipped with engraved or printed coordinate scales similar to those of Figure 1. A thin strip of transparent plastic 32 is attached to the center of base 31 by a hollow rivet 33. Strip 32 is free to rotate about rivet 33.

A straight narrow line 34 is engraved or printed along the middle of strip 32, and passes through the center of rivet 33.

A thin strip, or link, of transparent plastic 35 is attached to base 31 by rivet 33, and is free to rotate about rivet 33. Part 37 is a thin plate of transparent plastic which is attached to strip 35 by a hollow rivet 36, and is free to rotate about 36.

The various parts are preferably assembled in such a manner that plate 37 is located nearest base 31, strip 32 is above plate 37, and strip 35 is above strip 32.

Plate 37 contains a circular slot 38 which allows rivet 33 to pass through strips 32 and 35, both of which are above plate 37, without interfering with the rotation of plate 37 relative to strip 35. In other words, plate 37 can rotate about rivet 36, within the limits established by slot 38, without being interfered with by rivet 33.

On the under surface of plate 37 a narrow line 39 is engraved or printed. This line is in the form of a circular arc whose center is located at the center of rivet 36. At one end of line 39 is a small engraved or printed circle 40, and in the center of this circle is a small engraved or printed dot 41 which is used as an index in a manner that will be described. The distance of index 41 from the center of rivet 36 is equal to the radius of line 39.

In using the mechanism of Figure 7, the operator moves plate 37 until index 41 is located at the point on base 31 whose coordinates correspond to the complex number whose reciprocal is to be found. Then, while plate 37 is held in a fixed position, strip 32 is rotated until line 34 passes over the center of index 41. Point 42, where line 34 intersects line 39, is then the point whose coordinates correspond to the reciprocal of the given complex number. Thus, intersection 42 serves, in lieu of an index, as the means for pointing out the point on base 1 which represents the desired reciprocal.

The mathematical principles involved in the mechanism of Figure 7 are the same as those involved in the mechanism of Figure 1. Strip 32 of Figure 7 corresponds to rod 4 of Figure 1. Strip 35 of Figure 7 corresponds to link 18 of Figure 1. Plate 37 with its circular line 39 performs the same function as links 14 and 15 of Figure 1, because circle 39 establishes two points (41 and 42) on line 34 which are equidistant from rivet 36, while in Figures 1 links 14 and 15 establish two points on rod 4 that are equidistant from pivot 20.

To provide for special cases in which it is desirable to know the polar form of the complex number and its reciprocal, graduations can be provided along line 34, and a protractor scale can be located opposite one end of line 34. Such a protractor scale would be in the form of a graduated circular arc whose center coincided with the center of rivet 33.

Figure 8 shows an alternative mechanism for calculating reciprocals. This mechanism would be mounted on a base similar to base 1 of Figure 1, and equipped with a similar set of coordinate scales. Pivot 51 of Figure 8 would take the place of pivot 2 of Figure 1. Parts 2 to 20 inclusive of Figure 1 would be eliminated, and parts 51 to 68 inclusive of Figure 8 would be used instead.

In Figure 8, block 53 is free to rotate about pivot 51. Part 52 is a straight rod having a circular cross section, and this rod passes through a hole in block 53, where it is held in place by a set screw 54.

A block 56 is attached to block 53 by pivot 55, and block 56 is able to rotate freely about pivot 55. Parts 57 and 58 are straight rods of circular cross section, and they are attached to blocks 56 by forcing them into tight-fitting holes in block 56. Rods 57 and 58 are at right angles to each other.

Rod 57 passes through a hole in a block or cursor 59, which is free to slide along rod 57. Block 59 is attached to another block or cursor 61 by means of pivot 60. Rod 52 passes through a hole in block 61, which is free to slide along rod 52. Pivot 60 is attached to the upper part of block 61 and the lower part of block 59, and is made short enough so that it does not interfere with the motion of block 61 along rod 52 or the motion of block 59 along rod 57.

Figure 9, which is drawn to a larger scale than Figure 8, represents a section through parts 57, 59, 60, 61, 62, and 52, at the place indicated by arrows 9 in Figure 8. Figure 9 shows more clearly how pivot 60 is attached to block 59. A cylindrical hole 62 extends all the way through block 59 from top to bottom, and is made large enough to accommodate the cylindrical head of pivot 60, except for a short portion near the bottom of block 59, which is made just large enough to accommodate the shank of pivot 60. This pivot is just loose enough so that it can turn freely in the hole. Before block 59 is slipped over rod 57, pivot 60 is dropped into place in block 59 and is then forced into a tight-fitting hole in block 61, so that it does not readily come out of block 61. Pivot 60 does not extend far enough into block 61 to interfere with the motion of rod 52 through block 61.

Block or cursor 63, which is free to slide along rod 58, is similar to block 59. Block or cursor 64, which is free to slide along rod 52, is similar to block 61. Block 63 is attached to block 64 by a pivot 65, in the same manner as block 59 is attached to block 61.

Block 64 has a thin projecting tab or boss 66, on which a line 67 is engraved. The intersection of line 67 with the edge of this tab is used as an index, and is designated by the number 68. Similarly, block 61 has an associated index 69. Indexes 68 and 69 lie on an imaginary straight line which passes through the center of pivot 51.

Index 68 of Figure 8 is used in the same manner as index 10 of Figure 1; that is, it is placed over a point whose coordinates correspond to the real and imaginary components of the complex number whose reciprocal is to be found. Index 69 is used in the same manner as index 13 of Figure 1, for finding the real and imaginary components of the reciprocal of the original complex number.

The mathematical principles involved in Figure 8 can best be understood by referring to Figure 10. In this figure, KLM is a triangle in which angle M is a right angle. If a perpendicular $\overline{MN}$ is dropped from the vertex M, intersecting the hypotenuse at point N, we may write, $$\frac{\overline{KN}}{\overline{MN}} = \frac{\overline{MN}}{\overline{NL}}$$

or $$\overline{KN} = \overline{MN}^2 / \overline{NL} \qquad (8)$$

This is based on a well-known theorem which says, "In a right triangle the perpendicular from the vertex to the hypotenuse is the mean proportional between the segments of the hypotenuse." By comparing Figure 10 with Figure 8, and referring to Equation 8, we can see that the distance from index 69 to the center of pivot 51 is proportional to the reciprocal of the distance from pivot 51 to index 68.

For reading the polar values of impedances and admittances, rod 52 could be equipped with graduations, and a protractor scale could be located opposite one end of rod 52.

Figure 11 shows a simpler mechanism based on the same principles as the mechanism of Figure 8. Part 81 is a thin plate of transparent plastic, which would be attached to a base similar to base 1 of Figure 1. This attachment would be made by means of pivot 82, which would take the place of pivot 2 of Figure 1. Plate 81 would be free to rotate about pivot 82.

A narrow straight line 83, which is engraved or printed on the under side of plate 81, passes through the center of pivot 82.

Part 84 is another plate of transparent plastic, which is attached to plate 81 by means of pivot 85. This pivot may, for example, be a tubular rivet, and it should be loose enough to allow plate 84 to rotate freely relative to plate 81.

Two straight lines, 86 and 87, are engraved or printed on the under side of plate 84; they both pass through the center of pivot 85, and are at right angles to each other.

Pivots 82 and 85 should lie on an imaginary straight line which is at right angles to line 83.

To use the mechanism of Figure 11, the operator rotates plate 81 relative to the base (not shown), and rotates plate 84 relative to plate 81, until the point of intersection 88 of lines 83 and 86 is located so that its coordinates correspond to the complex number whose reciprocal is to be found. The location of the intersection 89 of lines 83 and 87 then corresponds to the reciprocal of this complex number. By reading the coordinates of point 89 the operator can obtain the desired reciprocal in complex form. Thus, although the mechanism of Figure 11 does not contain any specific points which permanently serve as indexes, the intersections 88 and 89 serve the same purpose, since they are used as means for pointing out certain points on the base of the mechanism.

For reading the polar forms of impedances and admittances, graduations could be provided along line 83, and a protractor scale could be placed opposite the end of line 83.

I have described what I believe to be the best embodiments of my invention. I do not wish, however, to be confined to the embodiment shown, but what I desire to cover by letters patent is set forth in the appended claims.

I claim:

1. In combination, a flat base, means for pointing out the location of a selected point on said base, means for pointing out the location of another point on said base, means connected to the first mentioned means for limiting the location of the second mentioned means to a straight line that passes through the first mentioned means and a fixed point on said base, and means connected to the first mentioned means for further limiting the location of the second mentioned means to a distance from said fixed point which is inversely proportional to the distance of the first mentioned means from said fixed point.

2. A combination according to claim 1 additionally including means for measuring the locations of the first mentioned means and the second mentioned means in terms of rectangular coordinates.

3. In combination, a flat base, means for pointing out the location of a selected point on said base, other means for pointing out the location of another point on said base, means for constraining the first mentioned means and the second mentioned means to lie on a straight line which always passes through a fixed point on said base but can have various directions relative to said base, and means for constraining the motion of the first mentioned means and the second mentioned means along said straight line so that the distance of the first mentioned means from said fixed point and the distance of the second mentioned means from said fixed point are inversely proportional to each other.

4. A combination according to claim 3, additionally including means for measuring the locations of the first mentioned means and the second mentioned means in terms of rectangular coordinates.

5. In combination, a flat base, a link pivoted at a fixed point on said base, means for indicating the locations of the intersections of a circle of fixed radius which has its center located on said link with a straight line which passes through said fixed point, and means for measuring the locations of said intersections in terms of rectangular coordinates.

6. In combination, a flat base, a link, a pivot attaching said link to a fixed point on said base, and means for locating two points which are equidistant from a point on said link and which also lie on a straight line passing through said pivot.

7. A combination according to claim 6, additionally including means for measuring the locations of said two points in terms of rectangular coordinates.

8. In combination, a flat base, two indexes movable over the surface of said base, means for constraining said indexes to lie on a straight line which always passes through a fixed point on said base but can have various directions relative to said base, and means for constraining the motion of said indexes along said straight line so that the distance of each of said indexes from said fixed point is inversely proportional to the distance of the other of said indexes from said fixed point.

9. A combination according to claim 8, additionally including means for measuring the locations of said indexes in terms of rectangular coordinates.

10. In combination, a straight rod, two cursors arranged to slide along said rod, a pivot attached to one of said cursors, another pivot attached to the other of said cursors, a link attached to the first mentioned pivot, another link attached to the second mentioned pivot, a third pivot connecting said links together at a point equidistant from the first mentioned pivot and the second mentioned pivot, another link attached to said third pivot, another pivot attached to the last mentioned link and occupying a fixed position relative to said rod, said position being on a straight line which passes through the first mentioned pivot and the second mentioned pivot.

11. A combination according to claim 10, additionally including means for measuring the locations of said cursors.

12. In combination, a flat base, means for pointing out the location of a selected point on said base, means for pointing out the location of another point on said base, means for limiting the location of the second mentioned means to a straight line that passes through the first mentioned means and a fixed point on said base, and means for further limiting the location of the second mentioned means to a circular arc whose center is limited in location to another circular arc whose center is located at said fixed point.

13. A combination according to claim 12, additionally including means for measuring the locations of the first mentioned means and the second mentioned means in terms of rectangular coordinates.

14. In combination, a flat base, a flat strip of transparent material attached by a pivot to said base at a fixed point on said base, a straight line marked on said strip and passing through said fixed point, another flat strip pivoted at said fixed point, a flat transparent plate attached to the second mentioned strip by another pivot, a circular arc marked on said flat plate, said arc being centered on the last mentioned pivot, and means for measuring the locations of the intersections of said arc with said straight line in terms of rectangular coordinates.

15. In combination, a straight rod, a laterally projecting member rigidly attached to said rod, a pivot located on said laterally projecting member, two other straight rods attached to said pivot and disposed at right angles to each other, two cursors, each arranged to slide along one of said other rods, two other cursors arranged to slide along the first mentioned rod and located on opposite sides of said laterally projecting member, each of said other cursors being pivoted to one of the first mentioned cursors.

16. A combination according to claim 15, additionally including means for measuring the locations of said cursors in terms of rectangular coordinates.

17. In combination, means for indicating the position of a straight line, a link pivoted at a fixed point on said straight line, and means for locating the intersections of said straight line with a circle of fixed radius which has its center at a point on said link.

18. In combination, a base, means for indicating the position of a straight line passing through a fixed point on said base, and means for locating the intersections of said straight line with two other straight lines which are at right angles to each other and which intersect at a point located on a straight line passing through said fixed point at right angles to the first mentioned straight line.

19. A combination according to claim 18, additionally including means for measuring the locations of the intersections of the first mentioned straight line with said two other straight lines in terms of rectangular coordinates relative to said base.

FREDERICK W. FRINK.

Certificate of Correction

April 27, 1948.

Patent No. 2,440,438.

FREDERICK W. FRINK

It is hereby certified that error appears in the printed specification of the above numbered patent requiring correction as follows: Column 4, line 39, Equation 6, for that portion of the equation reading "$\overline{AB}^2$" read $\overline{AD}^2$; and that the said Letters Patent should be read with this correction therein that the same may conform to the record of the case in the Patent Office.

Signed and sealed this 20th day of July, A. D. 1948.

[SEAL]

THOMAS F. MURPHY,
*Assistant Commissioner of Patents.*